United States Patent [19]

Allouis et al.

[11] Patent Number: 5,060,241
[45] Date of Patent: Oct. 22, 1991

[54] SYNCHRONIZING SYSTEM FOR A PRIVATE DIGITAL EXCHANGE CONNECTED TO AN ISDN

[75] Inventors: Jacques Allouis, Ostwald; Patrick Hauptmann, Strasbourg; Xavier Penet, Illkirch Graffenstaden; Pierre Saint-Ellier, Strasbourg, all of France

[73] Assignee: Telic Alcatel, Paris, France

[21] Appl. No.: 431,061

[22] Filed: Nov. 3, 1989

[30] Foreign Application Priority Data

Nov. 3, 1988 [FR] France ............... 88 14329

[51] Int. Cl.⁵ .................................. H04L 7/033
[52] U.S. Cl. .................. 375/108; 370/68.1; 370/100.1; 370/110.1; 375/120
[58] Field of Search ............ 370/68.1, 85.2, 100.1, 370/105.3, 110.1; 328/155; 375/107, 108, 120; 455/51

[56] References Cited

U.S. PATENT DOCUMENTS

| 4,161,786 | 7/1979 | Hopkins et al. | 370/85.2 |
| 4,596,025 | 6/1986 | Satoh | 370/85.3 |
| 4,633,193 | 12/1986 | Scordo | 375/108 |
| 4,794,596 | 12/1988 | Gloyne et al. | 375/107 |

FOREIGN PATENT DOCUMENTS 0228685 7/1987 European Pat. Off. .
0237247 9/1987 European Pat. Off. .

OTHER PUBLICATIONS

Siemens Telecom Report, vol. 11, No. 5, 1988, pp. 178-181-H. Beetz et al., "High-Precision Synchronization in the ISDN".
Fujitsu Scientific and Technical Journal, vol. 18, No. 3, Sep. 1982, E. Odera et al., "Fetex-150 Digital Switching System for Central Offices", pp. 351-380.

Primary Examiner—Benedict V. Safourek
Attorney, Agent, or Firm—Sughrue, Mion, Zinn Macpeak & Seas

[57] ABSTRACT

A synchronizing system for a private digital exchange (1) comprising a logic control unit (4) and specialized interfaces (9, 8) whereby the exchange is connected firstly to a plurality of subscriber terminals (2) via S0 accesses, and secondly to a telecommunications network (3) via T0 base accesses. The exchange includes a time base (6) which associates a fixed frequency local oscillator (7) with a phase locked loop (32). The system includes clock switching means suitable for imposing the first clock signals to come from the network (3) via an active one of the T0 base accesses and the associated interface (8) on the phase locked loop (32) of the time base (6) as soon as said first clock signals come close in phase to the substitute clock signals provided by the time base (6) in the absence of said first signals from the network.

8 Claims, 3 Drawing Sheets

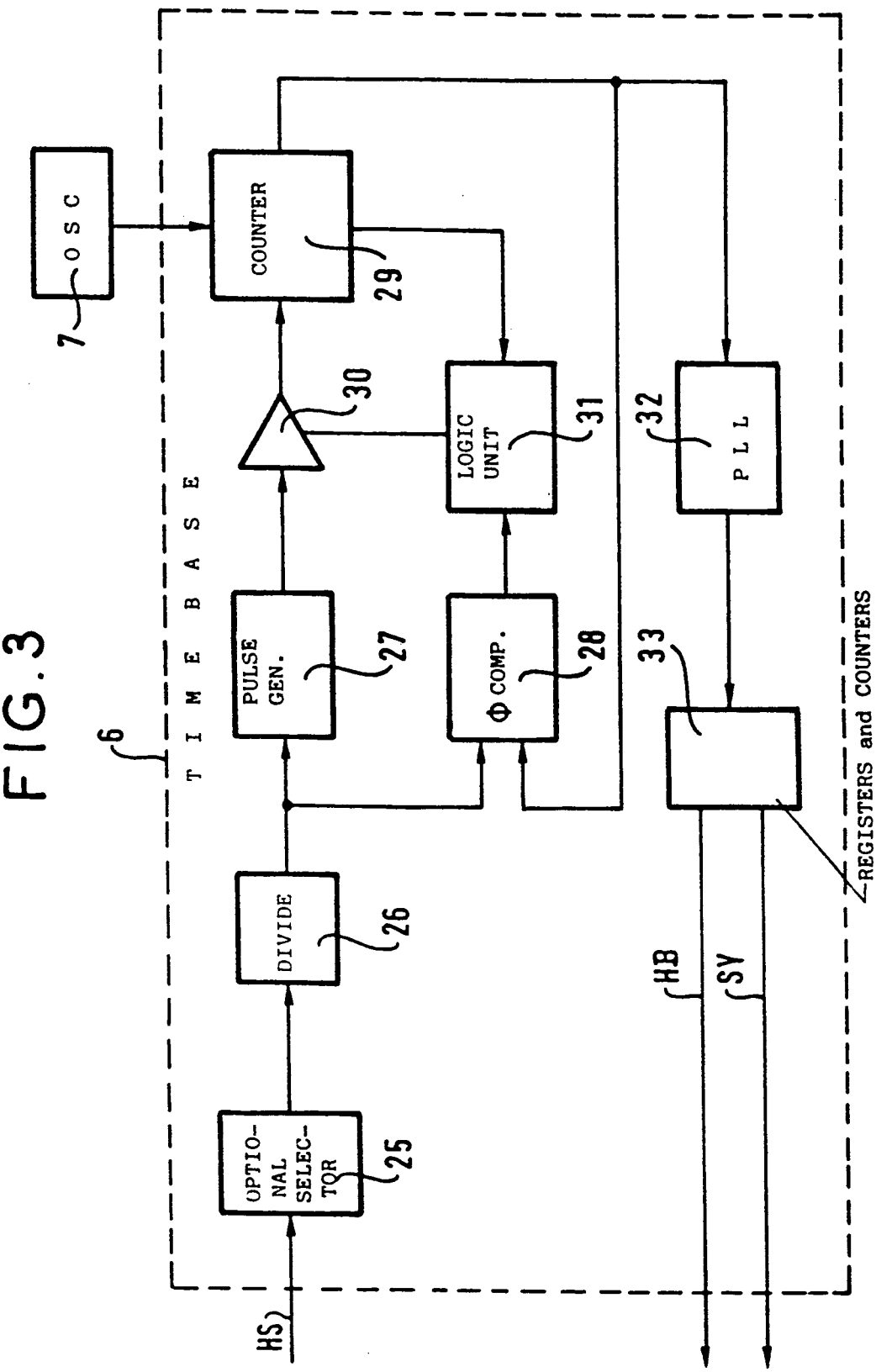

SYNCHRONIZING SYSTEM FOR A PRIVATE DIGITAL EXCHANGE CONNECTED TO AN ISDN

BACKGROUND OF THE INVENTION

The invention relates to a synchronizing system for a private digital exchange ccnneoted to an integrated services digital network (ISDN).

The fundamental characteristics of ISDNs as defined by Recommendations of the International Telegraph and Consultative Committee (CCITT), and which are destined to replace earlier telepphone networks, are described in numerous publications, including, for example: "Le RNIS techniques et atouts" (Techniques and Advantages of ISDN) published in France in 1987 in the Teleccommunications Technical and Scientific Collection by a group of people under the name G. DICENET.

One of the objectives of such networks is to make it possible to provide telephone and other services using a limited set of types of connection and versatile user-network interface arrangements.

The connection of private exchange type user installations to an ISDN is thus provided for via "base" accesses having the reference TO.

A TO base access is designed to be two-way, with two symmetrical pairs of conductor wires each providing one-way transmission with a maximum data rate of 192 Kbits per second (Kb/s).

Two "B" channels each having a capacity of 64 Kb/s serve to convey information in digital form and transparently, and a "D" channel having a capacity of 16 Kb/s serves to transmit data in packet mode for services as well as signalling which is likewise digitized. The remaining 44 Kb/s are used for management functions, in particular for frame synchronization and for activating the access. When base accesses are remotely powered by the ISDN, the pcwer consumption of the network can be reduced by deactivating base accesses while they are temporarily unused.

With an exchange type user installation connected to an ISDN via at least one TO base access, a time base is provided in the installation in order to provide the necessary clock signals and synchronizing signals in the event of the corresponding signals from the ISDN being absent, it being understood that network signals take priority as soon as communications pass via at least one TO base access.

SUMMARY OF THE INVENTION

The present invention thus proposes a synchronizing system enabling a private digital exchange connected to an ISDN via at least one TO base access to lock onto the network clock after any period of operation during which the exchange has been internally synchronized on its own time base.

The exchange comprises a controlling logic unit and specialized interfaces via which the exchange is connected firstly to a plurality of subscriber terminals, and secondly to a telecommunications network of the integrated services digital type. First ones of said specialized interfaces are connected to the network via base accesses through which digital information and/or signalling signals transit in both directions between the exchange and the telecommunications network, together with clock signals transmitted from the network to the exchange and the terminals. Second specialized interfaces are connected to the terminals by terminal accesses via which digital information and/or signalling signals are transmitted in both directions between the exchange and the terminals together with clock signals which are transmitted to the terminals.

The exchange also includes a time base associating, in particular, a local fixed-frequency oscillator with a phase locked loop so as to be suitable for providing the clock signals required for the exchange and for the terminals.

According to a characteristic of the invention, the synchronizing system comprises clock switching means suitable for imposing the first clock signals coming from the network via an active TO base access and the associated interface on the phase locked loop of the exchange's time base as soon as said first clock signals become close in phase to the corresponding clock signals provided by the time base when said first clock signals are absent, and this continues for as long as said first clock signals oontinue to be provided by the base access and the interface which transmits them.

BRIEF DESCRIPTION OF THE DRAWINGS

The invention, its characteristics, and advantages are described below with reference to the accompanying drawings, in which:

FIG. 3 is a block diagram of a time base for a synchronizing system of the invention.

DETAILED DESCRIPTION OF THE INVENTION

Figure 1:
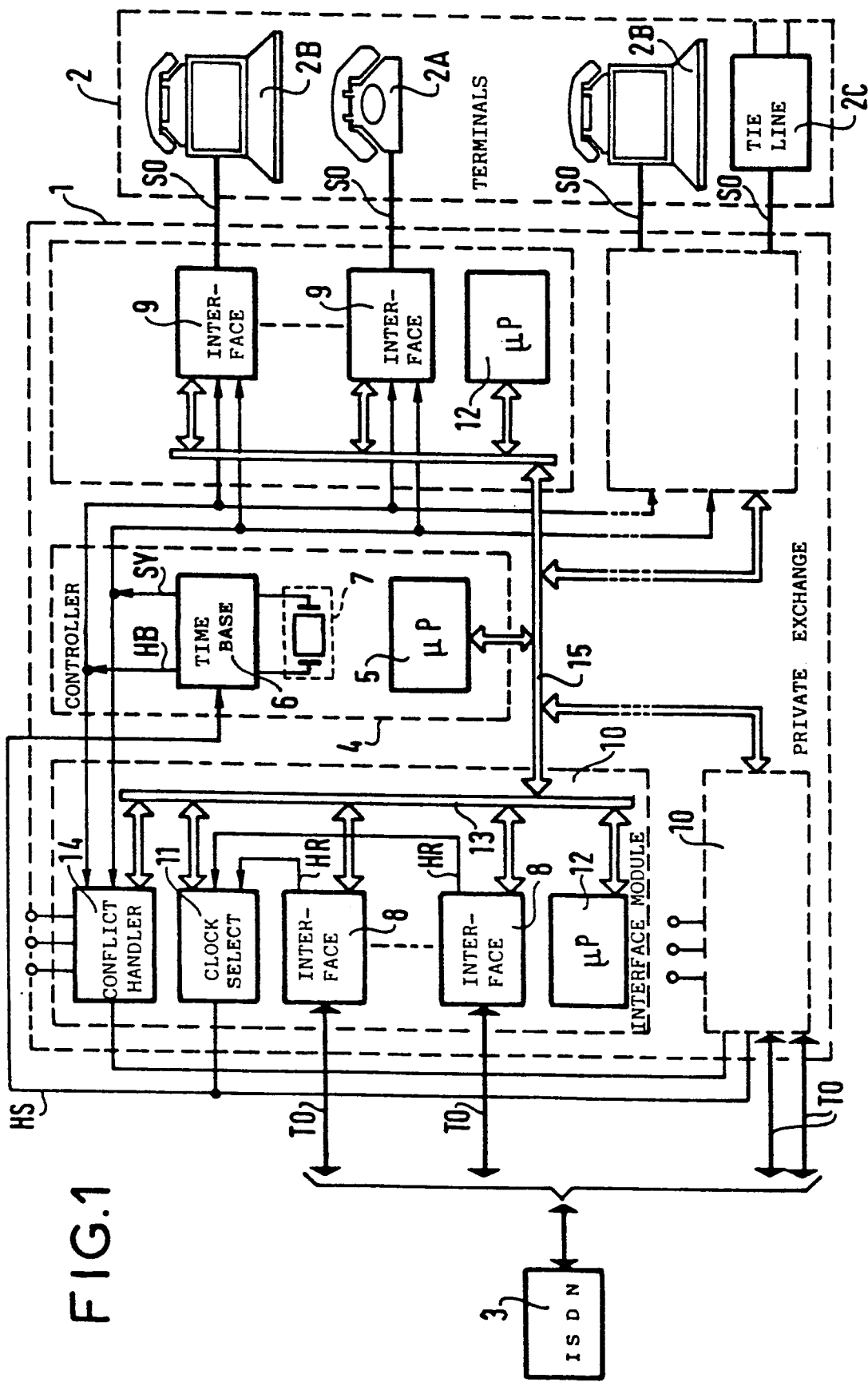
FIG. 1 is a block diagram of a synchronizing system of the invention for a private exchange connected to an ISDN.

The synchronizing system shown in FIG. 1 is intended to enable a private exchange 1 serving a set of terminals 2 to be synchronized with an ISDN 3 whenever the exchange 1 is connected to the network 3 via interfaces T as defined by the CCITT, with the exchange also being connect ed to the terminals via interfaces S.

Reference can be made to works on ISDNs, and in particular to the work mentioned above, for the operating and definition characteristics of such a network. It is merely recalled herein that the CCITT recommendations relating to ISDNs specify that a private exchange may be connected to an ISDN via "base" TO accesses, within each interface T. Each TO base access has line rate of 192 Kb/s which corresponds to a 2B+D type link in which two 64 Kb/s channels are reserved for transmitting voice and data signals and one 16 Kb/s D channel is suitable for signalling and transmitting data at a low rate.

Clock signals are incorporated in the digital signals transmitted over the ISDN to the terminals 2 via the exchange 1, and these include a bit clock whose frequency is 192 kHz and at least one frame synchronizing clock. These clocks can be transmitted by a TO base access only if the base access is activated, insofar as provision is made for deactivating the equipment constituting the digital line terminations of the ISDN and the terminals interconnected via a TO base access whenever there is no communication passing through the base access.

The physical link through a TO base access is provided by two pairs of wires, with each pair being reserved for transmitting digital voice signals, data signals and clock signals in one direction only, and with four other wires being provided for other purposes. including possible remote powering of terminals in the set of terminals.

The terminals in the set of terminals 2 may be very diverse, and they may be connected to the SO accesses of the interface S either directly, or else via appropriate adaptors (not shown herein). By way of example, the following are shown: a digital telephone set 2A; remote terminals 2B each associating a telephone set and a computer terminal; and a private network digital termination 2C. The structures of these items are not developed herein, insofar as they have no direct bearing on the invention.

Each SO access corresponds to a 2B+D link as defined above and serves to synchronize at least one terminal on clock signals transmitted for this purpose by the private exchange 1. The general structure of a private digital exchange is not described herein, and reference may be made to the Applicants' French patent number 2 503 497 on this topic, for example, with only those component parts that are required for understanding the synchronizing system of the present invention being described herein.

Similarly, it is recalled that the connection of a private digital exchange to an ISDN, described herein as taking place at the level of a T interface may also be performed at level U when the digital line terminations of the ISDN at the user end are physically situated within the private exchange, which makes practically no difference for the proposed synchronizing system.

As mentioned above, the terminals in the set 2 are designed to synchronize themselves on the clock signals that the exchange 1 transmits to them, with these signals being taken either from the ISDN 3, assuming that at least one of the TO base accesses is active, or else from the exchange itself assuming that none of the calls set up by the exchange is passing via the ISDN.

The exchange 1 has control logic 4 conventionally organized around at least one processor 5, and including a time base 6 suitable for receiving clock signals that may be coming from the network and which are picked up at any of the TO base accesses.

The time base 6 also receives signals from a crystal oscillator 7, which signals take the plaoe of the network signals when the network signals disappear.

The time base 6 provides the exchange 1 and the set of terminals 2 with the timing signals necessary for them to interohange data with each other and with the ISDN.

The clock signals obtained from the ISDN take priority and replace those derived from the crystal oscillator 7 as soon as activity in any of the TO base accesses makes this possible.

The time base 6 transmits the various timing signals (in particular a bit clock HB and a synchronizing clock SY) to the units concerned in the exchange 1, in particular the interface circuits 8 and 9 which are respectively connected to the TO base accesses for the ISDN and to the SO accesses for the terminals of the private exchange 1.

The interface circuits 8 attributed to the TO base accesses receive the digital signals provided to the private exchange 1 by the ISDN, and each of them includes a clock recovery circuit for obtaining a recovered clock signal HR from the digital signals it receives.

The clock recovery circuit may be constituted, for example, by the circuit ISAC-S (PEB) 2085 from the firm SIEMENS.

In one embodiment, n interface circuits 8 each serving a respective TO base access are combined in a single module 10, e.g. a card, and they all have access in parallel to a first clock select circuit 11 specific to the module.

The clock select circuit 11 is controlled by a module-controlling miorocontroller 12 which allows only one of the n recovered clock signals HR that may be generated within the module to be forwarded. The clock recovery circuit of an active interface circuit 8 in a module has priority over the identical circuits in any other interface circuits that may be activated subsequently. If two or more interface circuits 8 on the same card are activated simultaneously, priority is determined by the circuit 11.

A bus link 13 connects the microcontroller 12 to the clock select circuit 11 for this purpose, and it also serves the interfaces 8 and a conflict handler 14 for the various signal interchanges required for their operation. The interface circuits 8 which recover the clock signals also participate in interchanging voice and data signals between the ISDN and the private exchange 1 and its terminals.

The respective conflict handlers 14 of the modules 10 in a private exchange 1 allow a second choice to be made between the clock signals HR coming from different modules if that should be necessary, i.e. if TO base accesses served by different modules 10 are active simultaneously.

To this end, rotating priority is successively attributed to each of the modules using a process described below.

The recovered clock HR selected by means of the selection circuit and the conflict handlers is conveyed to the time base 6 of the exchange 1 in order to bring the time base into phase with the clock governing the ISDN, as soon as said clock reaches the exchange via at least one TO base access, and such clock signals can reach the exchange only via such accesses which may be deactivated temporarily.

As already mentioned above, the time base 6 provides all of the timing signals required for interchanging data between the terminals in the set 2 and the exchange 1, and consequently between the interfaces 8 and 9 which are used for such data interchanges, it being understood that the voice, data, and signalling signals constituting such data interchanges transit via switching connections which are not described herein since they do not bear directly on the invention. This is symbolized by a bus 15 interoonnecting the sets of interfaces 8 and 9 and also to their microcontrollers 12 and to the processor 5 in the exchange control unit 4.

Figure 2:
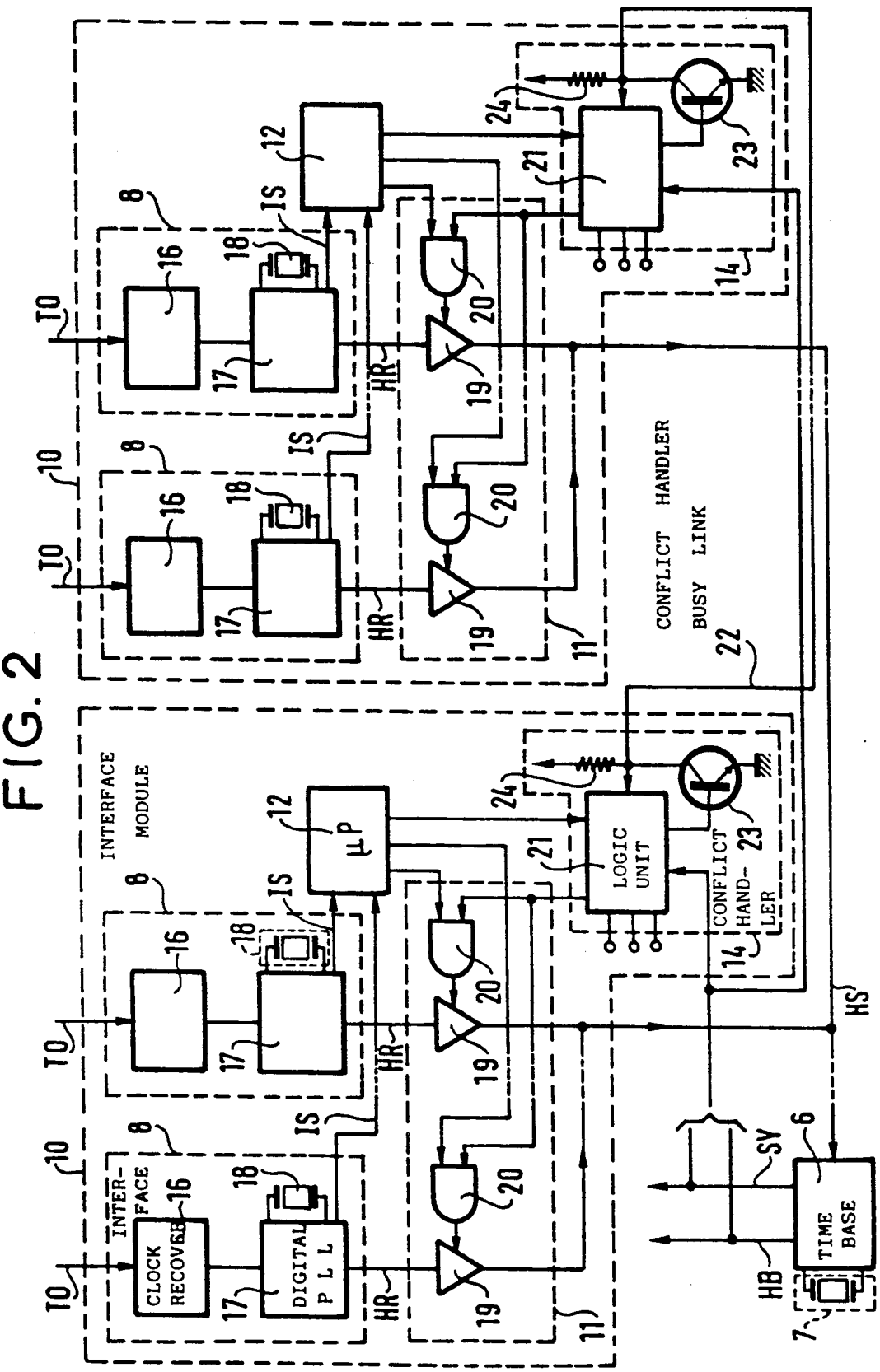
FIG. 2 is a block diagram of a clock acquisition subassembly for the synchronizing system of the invention.

In one embodiment, the interfaces 8 are constituted by PEB 2085 circuits made by SIEMENS and including, inter alia. a clock recovery circuit 16 and a digital phase locked loop 17 controlled by a crystal oscillator 18 (FIG. 2). Each TO base access, when active, receives signals from the ISDN, which signals include the bit clock signal at the frequency of 16 kHz incorporated therein. This bit signal is extracted by the recovery circuit 16 of the interface 8 serving the TO base access under consideration, and it is transmitted to the phase locked loop 17 in order to generate a clock signal HR which is in phase with the received bit clock signal. In the embodiment described, the clock signal HR is produced at a frequency of 512 kHz.

Since any of the TO base accesses serving a given exchange 1 may be activated in isolation, it is necessary to be able to process bit clock signals from the ISDN at each of them.

Unfortunately, beoause of dispersion in the components of the equipment and the links, the various TO base accesses connecting a given exchange 1 to an ISDN do not necessarily receive the bit clock signals governing the network at identical phase positions.

It is therefore necessary to take account of the possible effect on data transmission of phase jumps that may occur when switching from the bit clock signal provided by one of the base accesses to the signal provided by another, e.g. due to the first-mentioned access being deactivated.

It is also necessary to select that one of the bit clocks provided by the various base accesses which are active simultaneously which will take over in the event of the access which was previously providing such a bit clock being , deactivated.

To this end, the interfaces 8 in a given module 10 all provide a clock signal HR which is in phase with the bit clock signal received from the ISDN via the associated TO base access, with each of these signals HR being applied to the selection circuit of the module 10. In the embodiment shown, each phase locked loop 17 in a module 10 provides a synchronization flag IS to the microcontroller 12 of the module when it is locked on the bit clock. On the basis of the information received from the interfaces 8 under its supervision, the microcontroller 12 selects that one of the interfaces whose clock signal HR will next be transmitted to the time base 6 should the occasion arise. The selection may be performed, for example, on the basis of rotating priority in which the interfaces 8 are put on standby in succession, or else on the basis of a pre-established fixed priority between the interfaces within a given module. For example, this may be done by the phase locked loops 17 of a module 10 having their respective HR clock signal outputs interconneoted in parallel via gates 19 whose control inputs are selectively activatable by the microcontroller 12 of the module. In the embodiment shown, the HR clock outputs from the various modules are thus connected together to an input of the time base 6 with only one of them being authorized to transmit the HR clock signals to the time base.

To this end, the gate 19 in each interface 8 has its control input under the control of the conflict handler 14 of the module in which it is contained, via an AND gate 20 which also receives the activation control signal from the microcontroller 12.

The conflict handler 14 in a module includes a logic unit 21 which receives both the clock and synchronizing signals HB and SY delivered by the time base 6, and which also receives status and identification information, thereby enabling it to activate one of the gates 19 if its module is required to provide the time base with HR clock signals. The conflict handlers 14 in the various modules of the exchange 1 are all capable of individually marking a busy link 22 which is common to them all and which is indicative of a HR clock signal being transmitted by one of the modules, and consequently of at least one of the TO base accesses being activated.

In the embodiment shown, an NPN type transistor 23 is connected in series with a resistor 24 between ground and a potential V in each of the module 10, and serves to ground the busy link 22 under the control of the logic unit 21 in the module whenever the microcontroller 12 of the module tells the logic unit 21 of its module that at least one of the interfaces under its supervision is providing an HR clock signal which is phase locked on the ISDN clock.

The logic unit 21 aots on the base of the transistor 23 in the module which includes it and it is connected to the busy link 22 e.g. via the point common to the resistor 24 and the collector of the associated transistor 23. When the busy link 22 is marked by being grounded via a transistor 23 in one of the modules, this grounding is detected by the logic unit 21 in the other modules via the same busy link 22 to which they are all connected. This makes it possible to inhibit, in conventional manner, aotivation of the amplifiers 29 under the control of all of the logio units 21 other than the logic unit 21 which is doing the marking.

Each module 21 is individually identified by a hardwired address, e.g. on a mother board when the modules are oonstituted by plug-in cards. A comparator (not shown) in each logic unit 21 is connected to compare the hardwired address provided to a first set of its inputs with information provided to a second set of inputs by a counter which is synchronized by the frame synchronizing signal SY and activated by the clock HB from the time base. It is thus possible to allocate a time window to each module during a frame defined by the time base 6. The logic unit 21 in a module allows the busy link 22 to be marked by that module only during the time window attributed to the module in which it is contained, during the successive frames defined by the time base 6, and then only if the microcontroller of the module indicates that a phase locked HR clock signal is available at the outlet from one of the interfaces 8 in the module.

When the busy link 22 is marked by a logic unit 21 in a module, one of the amplifiers 19 in the module is activated via the corresponding gate 20 which receives both an activation all of the gates 20 in the module, and by an activation command from the microcontroller 12 of the module delivered by a second bistable (not shown). This command indicates that a phase locked clock signal is available at the output from the interface 8 to which the amplifier 19 in question is connected. The selected clock signal HS is sent to the time base 6 which is described in greater detail with reference to FIG. 3.

The time base 6 optionally includes an auxiliary clock selection and detection circuit 25 making it possible, for example, to select clock signals HS from a housing (not shown) containing the central unit and the modules 8 instead of from one or more other auxiliary housings containing other modules 8, with selection being established by any appropriate means, e.g. by fixed preference allocating.

The clock signal HS received by the time base 6 is preferably reduced in frequency by a phase locked divider 26. In the example shown, the divided down frequency is 64 kHz, and the resulting signal is transmitted in parallel to a synchronous pulse generator 27 and to one input of a phase comparator 28. The synchronous pulses obtained at the output from the generator 27 are applied to a reset-to-zero input of a counter 29 via a gate 30 whose control input is actuated by the phase comparator 28 via an auxiliary logic unit 31.

The clock input of the counter 29 receives the signals generated by a crystal oscillator 7 whose frequency is 16.384 MHz, for example, and it provides a reference clock signal at 64 KHz to a phase locked loop 32, and optionally a flag signal to the auxiliary logic unit 31 indicating that the input clock has been lost. The reference clock signal provided at the output from the counter 29 is transmitted to a second input of the comparator 28.

In the absence of any clock signal transmitted from the ISDN via a TO base access, i.e. when the base accesses are inactive, it is the oscillator 7 which serves as a reference for establishing clock signals that enable the exchange 1 to operate, said signals being obtained in conventional manner by means of a set of counters and registers 33 placed downstream from the phase locked loop 32. The phase locked loop is then controlled by the oscillator 7 via the counter 29.

In a preferred embodiment, the voltage controlled oscillator (not shown) contained in the phase locked loop 32 has a capture range of more than 100 ppm in order to take account of the tolerance accepted in free mode in the CCITT recommendations, and it is adjusted in such a manner as to occupy the middle of its adjustment range on receiving a signal from the counter 29 which corresponds to the signal as determined by the oscillator 7.

When a first TO base access is activated and clock signals from the ISDN are received via said base access, these clock signals are transmitted to the time base 6 and more specifically to the auxiliary circuit 25 for detecting the clock, and to the divider circuit 26.

The signal obtained after division, in this case by 8, is compared in phase with the signal at the corresponding frequency as produced by the counter 29 on the basis of the signal provided by the oscillator 7.

If the phase difference is less than a given angle, e.g. about 20°, then the control logic activates the gate 30 and the synchronous pulses produced by the generator 27 are applied to the reset-to-zero input of the counter 29, thereby controlling the output thereof. The timing signals produced by the set of registers and counters 33 on the basis of the output signal from the phase locked loop 32 are then positioned in frequency and phase relative to the signal from the ISDN by virtue of the action of the phase locked loop, and this continues for as long as the TO base access transmitting the clock signals remains active.

If this base access becomes inactive and ceases to transmit clock signals to the time base 6, the counter 29 receives clock signals only from the oscillator 7 which then takes over. The gate 30 is closed by the auxiliary logic unit 31 which receives information from the counter 29. The phase locked loop 32 compensates for any phase shift that may appear at the moment the ISDN clock disappears by progressively changing the cycle ratio of the signal it produces, either by lengthening or else by shortening, depending on the direction in which it catches up.

If a second TO base access has been simultaneously active with the access which was transmitting the ISDN clock signal and which has oeased to transmit the clock signal, then that simultaneously-active aocess takes over control of the time base using the ISDN-originating clook signals that it is transmitting. This takeover then takes place in the manner described above for the case where a first TO base access is activated after a period during which none of the accesses has been active.

We claim:

1. A synchronizing system for a private digital exchange (1), the exchange comprising: a controlling logic unit (4) and specialized interfaces (9, 8) via which the exchange is connected firstly to a plurality of subscriber terminals (2), and secondly to a telecommunications network (3) of the integrated services digital type, wherein said specialized interfaces comprise first specialized interfaces connected to the network via base accesses through which digital information and/or signalling signals transit in both directions between the exchange (1) and the telecommunications network (3), together with clock signals transmitted from the network to the exchange and the terminals, and second specialized interfaces connected to the terminals by terminal access via which digital information and/or signalling signals are transmitted in both directions between the exchange and the terminals together with clock signals which are transmitted to the terminals, said exchange also including a local fixed frequency oscillator (7), a phae locked loop (32) and a time base (6) associating said fixed-frequency oscillator (7) with said phase locked loop (32) and a time base (6) associating said fixed-frequency oscillator (7) with said phase locked loop (32) for providing the clock signals required for the exchange (1) and for the terminals connected thereto, the system being characterized in that it further comprises: clock switching means coupled to receive first clock signals from said specialized interfaces, which first clock signals are obtained from the network (3) via an active one of said base accesses and the associated interface (8), for comparing the phase of said first clock signals to the phase of clock signals provided by the time base (6) when the first clock signals are absent, and for imposing said first clock signals on the phase locked loop (32) of the exchange's time base (6) as soon as said first clock signals become close in phase to the corresponding clock signals provided by the time base (6) when said first clock signals are absent, and for continuing to impose said first clock signals on said phase locked loop for as long as said first clock signals continue to be provided by said active base access and the interface (8) which transmits them.

2. A synchronizing system according to claim 1, characterized in that it comprises a counter having a clock input receiving an output from said oscillator (7) and for providing a counter output to a reference input of the phase locked loop (32) of said time base, said counter having a reset-to-zero input, a divider for dividing down said first clock signals coming from said communications network, and a synchronous pulse generator (27) which receives the divided down version of said first clock signals and provides an output to said reset-to-zero input of said counter.

3. A synchronizing system according to claim 2, characterized in that it includes a gate (30) between the synchronous pulse generator (27) and the counter (29), an auxiliary logic unit (31) connected to the output of a phase comparator (28) having one input receiving the divided down version of said first clock signals coming from the telecommunications network and whose other input received the clock signals provided to the phase locked loop (32) by the counter (29) so as to ensure that said gate is activated only when the phase difference between the clock signals applied to the inputs of the comparator is less than a predetermined limited phase difference.

4. A synchronizing system according to claim 1, characterized in that the clock switching means include at least one clock select circuit (11) for selectively interconnecting one of the interfaces (8) connected to an active base access (TO) and the time base (6) of the exchange for transmitting the clock signals coming from the network (3) to said time base during the period of time for which said base access remains active after interconnection has taken place, together with at least one conflict handler (14) coupled to said clock select circuit for preventing other interfaces (8) having active base accesses being interconnected to the time base of the exchange so long as the already-interconnected interface (8) continues to transmit clock signals coming from the network (3).

5. A synchronizing system according to claim 4, for a private digital exchange in which the interfaces (8) having base accesses (TO) are connected together in modules (11), said modules each having a module-controlling microprocessor (12) and n base access interfaces, where n is an integer, the system being characterized in that it includes n clock select circuits each attributed to one of the modules, each clock select circuit comprising one gate (19) per interface (8) having base access (TO), the gate being inserted between said interface and the time base (6) of the exchange and being controlled together with the other gates by said module-controlling microprocessor (12) and by a set of conflict handlers (14) common to a plurality of modules.

6. A synchronizing system according to claim 5, characterized in that each conflict handler in said set of conflic handlers is connected to a busy link (22) which it shares with the conflic handlers of at least some of the other modules, and each conflict handler includes means for marking said busy link, means for reading the busy link in order to detect marking temporarily applied thereto by another conflic handler, and means for marking the link itself in the absence of marking applied by the other conflict handlers.

7. A synchronizing system according to claim 1, for a private digital exchange having at least one module comprising several first specialized interfaces (8) and a microcontroller (12) for controlling said several interfaces, each of said several interfaces being linked to said network by means of an individual base access (TO), characterized in that said switching means comprises:

a clock select circuit in each module for selectively connecting one of the several interfaces (8) of this module to the time base (6) for transmission of the clock signals from the interface to the time base;

a conflict handler for each module and coupled to said time base, to said clock selection circuit, to said microcontroller and to at least one otehr conflict handler in a different module, for preventing the connection of any interface to said time base other than a selected one of said interfaces, for as long as the selected one interface is transmitting clock signals.

8. A synchronizing system according to claim 7, characterized in that each of said conflict handlers is connected to a shared busy link and includes means for detecting a busy marking applied to the shared link and means for applying such a busy marking to said shared link when the time base is connected to one interface of the module in which the conflict handler is included.

* * * * *